Dec. 28, 1965  R. W. EDWARDS  3,226,675
INERTIAL RESPONSIVE STOP SIGNAL FOR VEHICLES
Filed July 5, 1960  2 Sheets-Sheet 1

INVENTOR
ROBERT W. EDWARDS
BY- Fetherstonhaugh & Co.
ATTORNEYS.

Dec. 28, 1965    R. W. EDWARDS    3,226,675
INERTIAL RESPONSIVE STOP SIGNAL FOR VEHICLES
Filed July 5, 1960    2 Sheets-Sheet 2
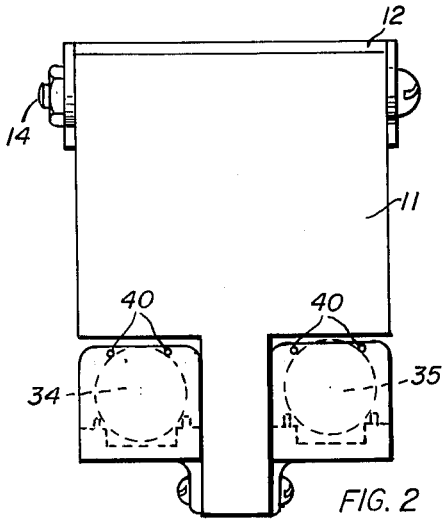
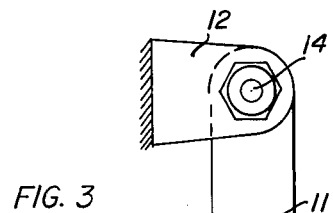
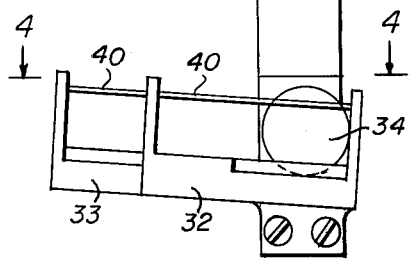
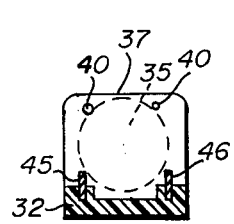
INVENTOR
ROBERT W. EDWARDS
BY- Fetherstonhaugh & Co.
ATTORNEYS.

United States Patent Office 3,226,675
Patented Dec. 28, 1965

3,226,675
INERTIAL RESPONSIVE STOP SIGNAL FOR VEHICLES
Robert W. Edwards, 253 Hugel Ave. W., Midland, Ontario, Canada
Filed July 5, 1960, Ser. No. 40,587
11 Claims. (Cl. 340—62)

This invention relates to vehicle signal apparatus.

All automobiles today are equipped with "stop lights" positioned at the rear of the automobile and which shine when the brake pedal of the automobile is depressed. These "stop lights," however, do not indicate whether or not the vehicle has actually come to a stop, but merely indicate that the brake pedal of the vehicle is depressed and that the vehicle is probably slowing down. There is no way for a following automobile driver to know whether or not the vehicle in front of him has actually come to a stop except by his own visual observation and estimation of the speed of the automobile. In many instances it would be desirable for a driver following a vehicle to know whether or not the vehicle in front of him has actually come to a full stop. Also, in many localities, traffic laws require that a driver approaching a main thoroughfare from a side street, or a red light, etc., come to a full stop before proceeding onto the thoroughfare or across it. From a distance, it is usually difficult to determine whether or not the vehicle has actually come to a stop, especially if the vehicle is viewed directly from the rear. If the vehicle were provided with some sort of signal which would indicate that the vehicle has actually come to a stop, law enforcement officers would undoubtedly find it easier to determine whether or not a driver was guilty of a traffic offense by reason of his failure to stop at a red light or a stop sign or the like.

Accordingly, the present invention provides a signal apparatus for a vehicle having brakes, comprising at least one inertial means sensitive to deceleration of the vehicle, and at least two switches one of which is responsive to the inertial means and the other of which is responsive to the application of the brakes of the vehicle. When all the switches are closed, a signal light or other signalling means generates a signal. The arrangement and operation of the inertial means and of the switches is such that the signal is given when the vehicle comes to a full stop.

The invention will now be described with reference to the accompanying drawings, in which:

FIGURES 2 and 3 are front and side views respectively of a second embodiment of a signal apparatus according to the invention;

FIGURE 4 is a plan view of the ball tracks shown in FIGURES 2 and 3; and

FIGURE 5 is an elevation view of one of the ball tracks.

Figure 1:
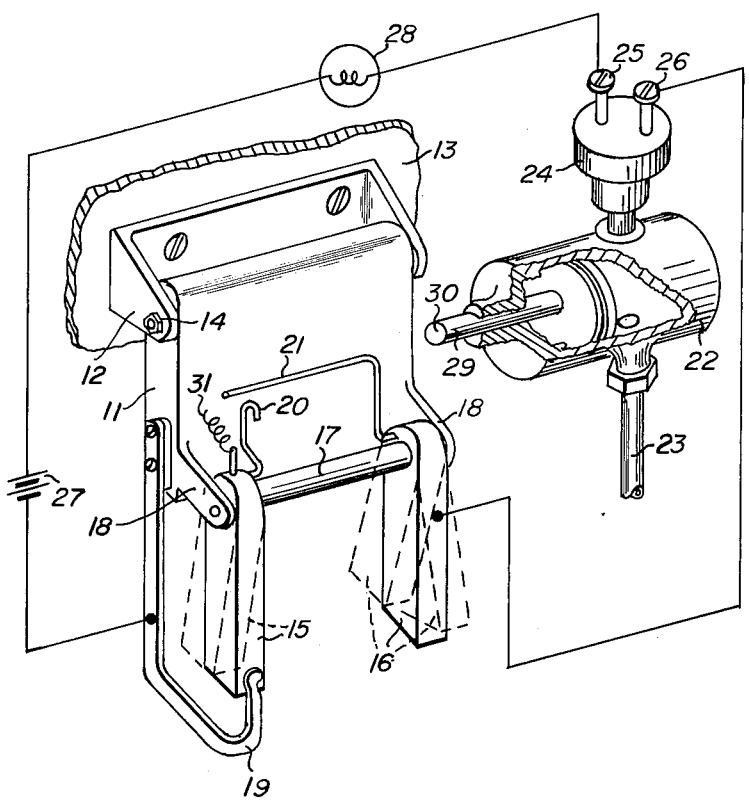
FIGURE 1 is a perspective view of an embodiment of the signal apparatus according to the invention.

FIGURE 1 shows a preferred embodiment of the signal apparatus according to the invention. A pendulum 11 is pivotally mounted on a bracket 12 which is firmly attached to the frame 13 of the vehicle. The pendulum 11 pivots freely about an axle 14 and is able to swing back and forth in the straight line direction of motion of the vehicle. In other words, the axle 14 is substantially parallel to the rear wheel axle on most automobiles.

Pivotally mounted on the pendulum 11 are two other pendulums 15 and 16. These two pendulums swing independently about an axle 17 which is mounted in end brackets 18 which may be a part of, or fixed to, the pendulum 11. The axle 17 is preferably made of insulating material; in any case, it is necessary in the embodiment shown that pendulum 15 be insulated from pendulum 16. Also attached to the pendulum 11 is a curved metal strip 19 which is adapted to make electrical contact with the lower portion of pendulum 15 when the pendulums 11 and 15 have the same angular position with respect to the vertical. Thus, pendulum 15 and strip 19 will be in electrical contact when the vehicle is at rest and the pendulum 11 and the pendulum 15 both are in a vertical position. A spring 31 attached to pendulum 15 and pendulum 11 tends to keep the strip 19 in contact with pendulum 15.

Fixed to the pendulum 15 is an electrical contact 20. This contact is adapted to make contact with an electrical contact 21 which is connected to the pendulum 16. It will be seen that contact 21 comes into contact with the contact 20 only when the pendulum 16 is displaced forward (i.e. in the forward direction of motion of the vehicle) through a greater angle than the pendulum 15.

Numeral 22 represents a cylinder, partially in section, which is filled with brake fluid and is connected to the hydraulic brake system of the vehicle by means of a connecting pipe 23. Connected to this cylinder is a pressure responsive switch 24 whose end terminals are designated by the numerals 25 and 26. The switch is adapted to be closed when the brake fluid pressure increases so as to apply the brakes of the vehicle. When the brakes are not applied, the pressure sensitive switch 24 is open. The circuit details of switch 24 are not shown, such switches being known in the art.

Switch 24, contacts 20 and 21, pendulum 15 and contact 19 are the three switches in an electric circuit which also includes a source of power 27 and an electric light 28. The light 28 might be an individual signal light, possibly of distinctive colour, mounted preferably at the rear of the vehicle (say midway between the two "stop lights" of the vehicle). In addition, a light may be mounted at the front of the vehicle to indicate to oncoming traffic that the vehicle has stopped, and a panel light may be provided so that the driver will known his "act of stopping" lights have flashed. If the front light is mounted just inside the front windshield, the front light may also be used as an indicator lamp for the driver. Thus, when the circuit is closed, current flows from power source 27 through the signal light 28, the pressure responsive switch 24, the pendulum 16, contact 21, contact 20, pendulum 15, and contact 19 back to the power source 27. The circuit will not be closed if the pressure responsive switch 24 is open or if contact 21 does not touch contact 20, or if pendulum 15 does not touch contact 19.

When the brakes of the vehicle are applied, the increase in brake fluid pressure in the cylinder 22 causes the piston 29 to be pushed against the pendulum 11, thus preventing the pendulum 11 from swinging. The operation of piston 29 should be comparatively swift so that the pendulum 11 will be fixed in a substantially vertical position. Thus the end 30 of the piston 29 should be positioned close to the pendulum 11.

It will be understood that the signal light 28 does not necessarily have to be positioned in close proximity to the other elements shown in FIGURE 1. The power source 27, which might be the battery of the vehicle, also does not have to be positioned near the other elements shown in FIGURE 1.

The operation of the apparatus shown in FIGURE 1 is as follows:

When the vehicle is travelling along the highway, pendulums 11, 15, and 16 are free to swing. These pendulums will tend to maintain a vertical position regardless of whether the vehicle is going uphill, downhill, or on the level. Thus, when the vehicle is stopped or when it is travelling at a steady speed, pendulum 15 will be in electrical contact with contact 19. However, since both pendulums 15 and 16 will tend to maintain the same angular position, contacts 21 and 20 will not be in contact. Furthermore, the brake pedal will not be depressed and therefore the pressure responsive switch 24 will be open.

When the brakes of the vehicle are applied, the brake fluid pressure increases causing piston 29 to press against pendulum 11, thereby fixing pendulum 11 in a vertical position. At the same time, the pressure responsive switch 24 is closed. The pendulums 15 and 16 will swing forward, as a result of deceleration of the vehicle, into positions which might be indicated by the forward dotted lines shown in FIGURE 1. The word "deceleration" as used herein, and in the appended claims, is used to refer only to deceleration in a substantially horizontal direction. The pendulums will continue to assume a forward position as long as the vehicle decelerates, and thus the pendulum 15 will not be in contact with contact 19.

When the vehicle comes to a full stop, deceleration ceases and pendulums 15 and 16 will swing into a vertical position. The spring 31 connected between the pendulums 11 and 15 causes the pendulum 15 to return to its vertical position and to make contact with the contact 19 sooner than the pendulum 16 returns to its vertical position. Thus, for a brief moment, the contact 21 will be in contact with the contact 20 because the pendulum 16 is displaced forward at an angle to the vertical, while the pendulum 15 is vertical. During this brief moment, at the time when the vehicle has come to a full stop, the pendulum 15 will be in contact with the contact 19, contacts 20 and 21 will be in contact, and the switch 24 will be closed. Thus the signal light 28 will shine briefly when the vehicle comes to a full stop. Many switches are known which, when closed by a brief switching action, open only after some delay (say 2 sec., 5 sec., etc.). This sort of switching operation can be incorporated into apparatus according to the invention to insure that the signal light remains on for a certain minimum length of time.

There will be a few freak occasions when the above operation will not take place as described. For example, if a car is travelling uphill when the brakes are first applied, the pendulum 11 will be fixed in the vertical position corresponding to the vehicle's uphill direction of motion. However, if the vehicle should continue to decelerate while going over the hill and should come to a full stop when heading downhill, the pendulum 11 will be fixed by action of the piston 29 in a position which is by no means vertical. Thus, when the vehicle comes to a full stop, the vertical position of the pendulum 15 will not bring it into contact with the electrical contact 19, and thus there will be no signal flash from the signal light 28. However, such circumstances as the one just described will occur comparatively infrequently, and the apparatus shown in FIGURE 1 will operate satisfactorily nearly all of the time. An additional pendulum swinging freely on the pendulum 11 might be used to open the circuit if the pendulum 11, after being fixed in position, deviates too far from the vertical. This would prevent any possible undesirable flash of the signal light due to freak conditions.

It will be noted that not all of the elements shown in FIGURE 1 are absolutely necessary. For instance, the pendulum 16 could be eliminated and terminal 26 connected directly to pendulum 15. The operation of the rest of the apparatus would be the same as described above. The spring 31 would not be necessary in the modified apparatus. The operation of the modified apparatus is as follows:

When the vehicle is travelling at constant speed, the pendulums 11 and 15 will tend to assume a vertical position and will adjust for any uphill or downhill motions of the vehicle. When the brakes are applied, the piston 29 will be forced against the pendulum 11, thereby fixing the pendulum 11 in a vertical position. At the same time, the pressure responsive switch 24 will be closed. The pendulum 15 will for an instant be in contact with the contact 19, but as soon as deceleration begins, the pendulum 15 will swing away from the contact 19. Thus, for a brief instant while the vehicle is moving fairly swiftly, the signal light 28 may flash. This flash is not likely to be misleading to a motorist or traffic officer watching the vehicle, however, since it will be quite apparent that the vehicle is moving with some perceptible velocity. The flash of the signal light 28 could be eliminated when the brakes are first applied by having the switch 24 close only after some delay, thereby allowing the pendulum 15 to swing free of the contact 19 before the switch 24 is closed.

While the vehicle is decelerating, the pendulum 15 will be clear of the contact 19 and thus the signal light 28 will receive no current. However, as soon as the vehicle ceases to decelerate, the pendulum 15 will swing into its vertical rest position and will come into contact with the contact 19. Since the switch 24 is closed, the signal light 28 will come on. It will be noted that as long as the driver maintains the brake fluid pressure by keeping the brake pedal depressed, the light 28 will continue to shine. This is in contrast to the description of the operation of the circuit of FIGURE 1 with pendulum 16 present, wherein the signal light 28 flashes briefly at the moment when the vehicle stops and does not remain on if the driver continues to depress the brake pedal.

It is also possible to use the apparatus of FIGURE 1 without benefit of the pendulum 11. The pendulum 11 may be assumed to be fixed to the bracket 12 in a vertical position. The rest of the apparatus functions as described above, except that the piston 29 is superfluous. When the vehicle is travelling at constant speed, the pendulums 15 and 16 will assume a vertical position. When the brakes are applied and the vehicle decelerates, pendulums 15 and 16 both move forward from their vertical positions and thus pendulum 15 will not be in contact with the contact 19. The switch 24 will be closed by reason of the increased brake fluid pressure. When the vehicle comes to a full stop, the pendulum 15 will return to its vertical position sooner than the pendulum 16 by reason of the action of the spring 31 as described above. Thus, provided the vehicle is travelling more or less on the level, the pendulum 15 will be in contact with the contact 19 and for a brief instant the pendulum 16 will be forward of the pendulum 15, thereby causing the contact 21 to come into brief contact with the contact 20. Thus the signal light 28 will flash briefly when the vehicle comes to a full stop. However, the disadvantage of this arrangement is that if the vehicle is not on the level but is on a grade, the operation of this arrangement is not completely satisfactory. If the vehicle is moving downhill, the pendulum 15 will not come into contact with the contact 19 when it resumes its vertical position. If the vehicle is heading uphill, the pendulum 15 may stay in contact with the contact 19 despite the deceleration of the vehicle. Thus, this arrangement is useful only when the vehicle is not on a hill when coming to a stop. It is possible that even this arrangement might be useful in some regions such as the Canadian prairies.

It is to be understood that the invention is not limited to the particular elements shown in FIGURE 1. While a signal light 28 is shown, a signal horn might also be used, for example, although a signal light seems to be preferable for most applications. It is not necessary that the switch 24 be a pressure responsive switch; it might instead be a switch connected to the brake pedal mechanism and adapted to be closed only when the brake pedal is depressed. It is not necessary that current flow through either pendulum 15 or pendulum 16. It is sufficient that an electric switch be closed when pendulums 11 and 15 are in a vertical position, and that a second switch be closed when the forward angular displacement of pendulum 16 is greater than that of pendulum 15. It is not necessary that pendulums 15 be mounted on the same axle or even in the same plane. As has been mentioned above, it is possible to eliminate pendulum 16 and still have a useful apparatus. It is also possible to eliminate pendulum 11 and retain pendulums 15 and 16, but such a modification is unsatisfactory when the vehicle comes to a stop on a hill.

FIGURES 2 and 3 show another embodiment of signal apparatus according to the invention. The pendulum 11 mounted on a shaft 14 in bracket 12 attached to frame 13 of the vehicle, is substantially the same as the corresponding pendulum 11 shown in FIGURE 1. It is pivotally mounted in the same manner, i.e. so as to be able to swing in the forward direction of movement of the vehicle. Instead of two pendulums 15 and 16 as shown in FIGURE 1, two ball tracks 32 and 33 are mounted on the pendulum 11 shown in FIGURES 2 and 3. Metal balls 34 and 35 are positioned in the ball tracks 32 and 33 respectively and are able to move freely in the ball tracks. The forward movement of the balls is limited by end sections 36 and 37 of the ball tracks. Likewise, the rearward movement of the balls is limited by ends 38 and 39 of the ball tracks. Overhead bars 40 ensure that the balls will not be thrown out of the ball tracks when the vehicle goes over a bump. The ball tracks are slightly inclined to the horizontal (when the pendulum is in a vertical position) so that the balls tend to remain in the rearmost portion of the ball tracks (see FIGURE 3).

The ball track 32 is divided into a conducting portion 41 and a non-conducting portion 42. The ball track 33 is divided into a conducting portion 43 and a non-conducting portion 44. A section view taken along the conducting portion of ball track 33 at 5—5 in FIG. 4, is shown in FIGURE 5. The two conductors 45 and 46 may be embedded in a non-conducting base. When the ball is in the conducting portion of the ball track, an electrical connection is made between conductors 45 and 46 through the metal ball. The conducting portion 41 of ball track 32 is the same as conducting portion 43 of ball track 33. As can be seen from FIGURE 4, the current path is from lead 47 through conducting portion 41 of ball track 32, lead 49, conducting portion 43 of ball track 33, and finally lead 48. Leads 47 and 48 may be connected to the source of power 27, the signal lamp 28, and pressure sensitive switch 24 shown in FIGURE 1. A cylinder 22 with piston 29 should also be used with the apparatus shown in FIGURES 2 through 5. In other words, the ball tracks may be substituted for the pendulums in FIGURE 1, and terminals 47 and 48 connected to power source 27 and pressure sensitive switch 24. Otherwise, the two systems are identical.

When the vehicle is stationary or when it is moving with a constant velocity, the pendulum 11 will tend to assume a vertical position. Thus balls 34 and 35 will be in the rearmost portions of the ball tracks, resting against the end sections 38 and 39. No current will flow through the signal lamp 28, since pressure sensitive switch 24 is open and ball 35 does not make contact with the conducting portion 43 of the ball track 33. When the brakes of the vehicle are applied, the piston 29 is forced against the pendulum 11, thus fixing it in a vertical position. The deceleration imparted to the vehicle by the application of the brakes causes the balls 34 and 35 to roll forward in their respective ball tracks. It will be noted that at the instant the brakes are first applied, the pressure responsive switch 24 will be closed, but ball 35 will still be in a non-conducting portion of its ball track. Thus the signal light 28 will not flash. When the balls move forward, the ball 35 will reach the conducting portion 43 of the ball track 33. If the ball 34 is still in a conducting portion of ball track 32, then the light would flash. However, ball 34 moves forward with ball 35, and thus reaches non-conducting portion 42 of the ball track at about the same instant as ball 35 reaches the conducting portion 43 of its ball track. It is preferable that ball 34 should reach a non-conducting portion of its ball track somewhat sooner than ball 35 reaches the conducting portion of its ball track, so as to avoid causing the signal light to flash. This can be accomplished simply by properly designing the lengths and/or angles of inclination of the conducting portions of the two ball tracks.

While the vehicle is decelerating, the balls 34 and 35 will be in the forward position of the ball tracks resting against end barriers 36 and 37. However, when the vehicle comes to a stop, the balls will, under the influence of gravity, roll down the inclined ball tracks 32 and 33 to their rest positions against walls 38 and 39. Since ball track 32 is appreciably shorter than ball track 33, the ball 34 reaches the conducting portion 41 of its ball track while the ball 35 is still on the conducting portion 43 of its ball track. Thus, for a brief instant, the signal light 28 will flash, since the circuit is closed. The signal light 28 will go off, however, when the ball 35 reaches the non-conducting portion 44 of the ball track 33.

Instead of, or in addition to, designing the ball track 32 to be shorter than ball track 33, it is possible to incline the ball track 32 at a greater angle to the horizontal (when the pendulum is vertical) than the ball track 33. This difference in inclination assists the ball 34 to reach its rearmost position more quickly than the ball 35, which is the effect desired.

It was previously mentioned that the pendulum 16 could be eliminated from the apparatus according to FIGURE 1. Similarly, it is not absolutely necessary to have the ball track 33 in the last mentioned embodiment of the invention. Instead, lead 49 could be connected directly to pressure sensitive switch 24. The operation of the apparatus would then be similar to the operation of the apparatus of FIGURE 1 with pendulum 16 removed and pendulum 15 connected directly to terminal 26 of switch 24. Also, it is possible to eliminate pendulum 11 and use two ball tracks 32 and 33 with a fixed slight inclination to the horizontal. The operation of this modified circuit is similar to that described above in the description of FIGURE 1, with the pendulum 11 fixed at all times.

It is possible to alter the mechanical and electrical details of this apparatus in order to obtain similar results.

The embodiments of the invention in which an exclusive property or privilege is claimed are defined as follows:

1. Apparatus for signalling the act of stopping a vehicle having brakes, comprising a first pendulum pivotally mounted on a second pendulum which is pivotally mounted on the vehicle, each pendulum being mounted to swing freely about a substantially horizontal axis which is substantially at right angles to the straight-line direction of motion of the vehicle; means to fix the position of the second pendulum in response to application of the brakes of the vehicles; a first normally-closed switch responsive to motion of the first and second pendulums, said switch moving to open position when the center of gravity of the first pendulum is displaced forward through a substantially greater angle relative to the pivotal axis of the first pendulum than the angle through which the center of gravity of the second pendulum is displaced forward relative to the pivotal axis of the second pendulum; a normally-open second switch serially connected to the first switch; means controlling said second switch in response to the application of vehicle brakes for moving the second switch to closed position; and electrically actuated signalling means controlled by said switches and giving a signal when the first and second switches are both closed.

2. Apparatus as claimed in claim 1, wherein the two switches and the signalling means are connected in series.

3. Apparatus as claimed in claim 1 and having a third pendulum pivotally mounted on the second pendulum to swing freely about a substantially horizontal axis which is substantially at right angles to the straight line direction of motion of the vehicle, the first pendulum being mounted to return to its rest position after termination of deceleration of the vehicle more quickly than the third pendulum, and having a third switch being normally open and being closed when the center of gravity of the third pendulum is displaced forward from its rest position through a substantially greater angle than the angle through which the center of gravity of the first pendulum is displaced forward from its rest position, the signalling means giving a signal when the third switch is closed.

4. Apparatus as claimed in claim 3, having a spring connected between the first and second pendulums, the spring opposing displacement of the first pendulum forward with respect to the second pendulum.

5. Apparatus for signalling the act of stopping of a vehicle having brakes, comprising a ball mounted upon a ball track to run freely substantially parallel to the straight-line direction of motion of the vehicle, said ball track being fixed to a pendulum pivotally mounted on the vehicle, the pendulum being mounted to swing freely about a substantially horizontal axis substantially at right angles to the straight-line direction of motion of the vehicle, the ball resting in its rearmost position on the ball track when the pendulum is in a vertical position and the vehicle is not subjected to deceleration, means controlled by the application of the vehicle brakes to fix the position of the pendulum when the brakes are applied, the ball moving forward along the ball track when the vehicle is subjected to deceleration, a normally-closed first switch responsive to motion of the ball and moving to open position when the ball moves forward along the ball track, a normally-open second switch serially connected to the first switch; means responsive to the application of the brakes and closing the second switch when the brakes are applied, and electrically-actuated signalling means controlled by said switches and giving a signal when the first and second switches are both closed.

6. Apparatus as claimed in claim 5, wherein the two switches and the signalling means are connected in series.

7. Apparatus as claimed in claim 5, and having a second ball mounted to run freely substantially parallel to the straight-line direction of motion of the vehicle on a second ball track fixed to the pendulum, the second ball moving to rest in its rearmost position on the second ball track when the pendulum is in a vertical position and the vehicle is not subjected to deceleration, the second ball being mounted to move forward along the second ball track when the vehicle is subjected to deceleration, the second ball being mounted to return at a later time than the first-mentioned ball to its rearmost position after the vehicle ceases to decelerate, and a third switch mounted to be open when the second ball is in the vicinity of its rearmost position on the second ball track, the signalling means being responsive to closure of the third switch and giving a signal when the third switch is closed.

8. Apparatus as claimed in claim 7, wherein both ball tracks are inclined at substantially the same angle with respect to the pendulum, but the second ball track is substantially longer than the other.

9. Apparatus as claimed in claim 7, wherein both ball tracks are substantially the same length, but the second ball track is more nearly horizontal than the other ball track when the pendulum is in its rest position.

10. Apparatus for signalling the act of stopping of a vehicle having brakes, comprising first and second inertial elements free to move relative to said vehicle in the direction of travel of the said vehicle and mounted on a pendulum pivotally connected to the vehicle and being free to oscillate relative to the vehicle about a horizontal axis normal to the straight-line direction of travel of the vehicle, means retarding forward motion and accelerating the rearward motion of the first inertial element, means coupled to the brake system of said vehicle and preventing movement of the said pendulum relative to said vehicle when said brakes are applied, an electric circuit having its components serially connected in a closed loop, said components including a source of power, a signalling element and first, second and third switches, said first switch being normally open and mechanically connected to the brake system and closing when said brakes are applied, said second switch being normally closed and being responsive to the movement of said first element and opening during deceleration of said vehicle to a stop position, and said third switch being responsive to movement of said second element to be closed immediately following the termination of said deceleration to a stop position.

11. Apparatus as defined in claim 10 wherein said first and second elements are second and third pendulums respectively pivotally connected to the first-mentioned pendulum and free to oscillate in vertical planes parallel to the direction of travel of said vehicles.

References Cited by the Examiner

UNITED STATES PATENTS

| | | | |
|---|---|---|---|
| 2,420,351 | 5/1947 | Brown | 340—262 |
| 2,618,712 | 11/1952 | Moledzky | 340—65 |
| 2,751,575 | 6/1956 | Jacobs et al. | 340—262 |
| 2,894,088 | 7/1959 | Prather | 340—262 |
| 2,946,042 | 7/1960 | Beasley | 340—262 |
| 2,982,944 | 5/1961 | Weller | 340—262 |
| 3,004,240 | 10/1961 | Berg | 340—74 |

FOREIGN PATENTS

| | | |
|---|---|---|
| 637,939 | 5/1928 | France. |
| 118,017 | 1/1944 | Australia. |

NEIL C. READ, *Primary Examiner.*

E. JAMES SAX, ROBERT H. ROSE, *Examiners.*